UNITED STATES PATENT OFFICE.

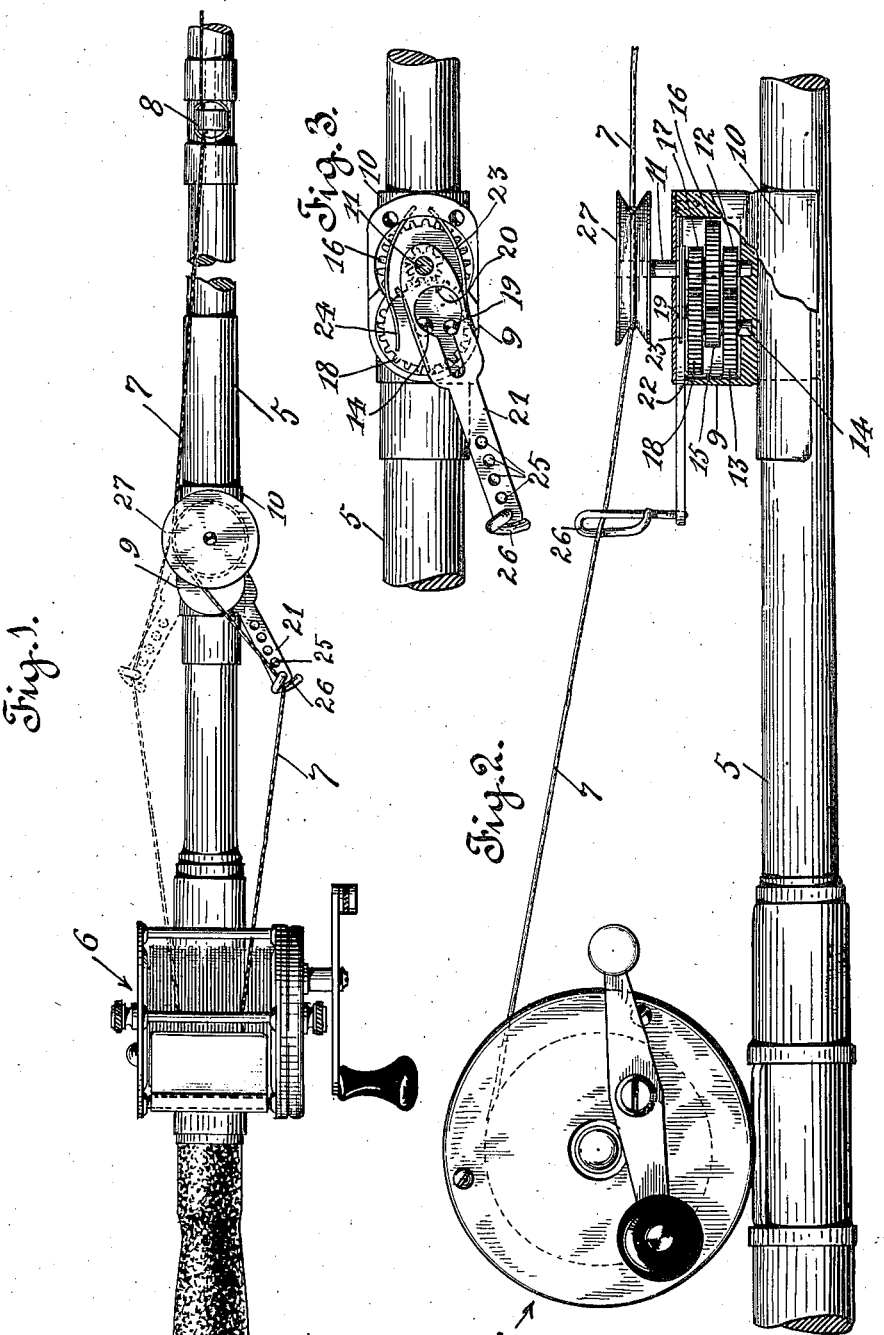

CARL F. CAPELL, OF LOS ANGELES, CALIFORNIA.

LINE-WINDING ATTACHMENT FOR REELS.

1,043,397.  Specification of Letters Patent.  Patented Nov. 5, 1912.

Application filed October 13, 1910. Serial No. 586,821.

*To all whom it may concern:*

Be it known that I, CARL F. CAPELL, a citizen of the United States, residing in the city of Los Angeles, county of Los Angeles, State of California, have invented new and useful Improvements in Line-Winding Attachments for Reels, of which the following is a specification.

My invention relates to an attachment to be secured upon a fishing pole, whereby the fishing line is evenly wound upon the reel, and the object thereof is to provide a simple automatic device for that purpose. I accomplish this object by the device described herein and illustrated in the accompanying drawings, in which:—

Figure 1 is a side elevation of a fragment of a fishing pole with a reel and my improved line winding attachment in place thereon. Fig. 2 is an enlarged edge view of a portion of the pole showing an end elevation of the reel with a portion of the case of the winding attachment removed for clearness of illustration. Fig. 3 is an enlarged top plan of the line winding attachment in place on a fragment of the pole with the top plate and operating sheave removed for clearness of illustration.

In the drawings 5 is a fishing pole of any approved form upon which a reel 6 of any approved construction is secured in the usual manner.

7 is the fishing line which is secured upon the reel and passes through guide eyes on the fishing pole one of which, 8, is shown in Fig. 1.

Intermediate the rear guide eye and the reel and removably secured upon the pole is my improved line winding attachment. This attachment consists of a casing 9 to the bottom of which is secured spring clamp 10 which partially surrounds the fishing pole and holds the casing removably secured thereon. In the casing is revolubly mounted the sheave shaft 11 to which is rigidly secured pinion 12, which meshes with gear 13 rigidly secured upon gear shaft 14 which is revolubly mounted in the bottom plate of the casing. Gear shaft 14 also carries a pinion 15 rigidly secured thereto which meshes with gear 16 loosely mounted upon the sheave shaft. Gear 16 has secured thereto a pinion 17 which also is loosely mounted on the sheave shaft. Pinion 17 meshes with gear 18 which is loosely mounted on gear shaft 14. Gear 18 carries stud 19 which projects into cam slot 20 of the line winding arm 21. The line winding arm is loosely mounted on the sheave shaft and projects through a slot 22 in the end of the case toward the reel. Springs 23 and 24 are secured in the case and bear against the edge of the line winding arm so as to normally hold the same central with the pole when the fishing line is not taut. In the outer end of the line winding arm are a number of threaded holes 25, in one of which is screwed the line hook 26. These holes are spaced apart so as to adjust the line hook to different positions on the arm for use with reels of different sizes. On the top of the sheave shaft is the sheave 27 around which one or two turns of the line is taken when fishing.

The operation of my attachment is as follows: After being positioned as shown in the drawings on the fishing pole, the operator will cast his line in the usual manner. He then places the line 7 in the line hook 26 and makes one or two turns of the line around sheave 27. Thereafter when the line is paid out or reeled in, the movement of the line rotates the sheave, which in turn operates the pinions and gears, which constitute a train of wheels, and thereby causes the line arm to oscillate backward and forward as the line is wound in on the reel, or paid out from the reel. The oscillation of the line arm as the line is being wound upon the reel causes the line to be evenly wound upon the reel.

By the use of my device the fisherman is not required to pay any attention to the winding of the line upon the reel, as the oscillation of the line arm automatically causes the line to be evenly wound upon the reel, thus enabling him to pay his sole attention to manipulating the reel so as to land the fish. After the line is wound in, if he desires to make a new cast he simply loosens the line from the sheave, makes his cast, and then winds the line again on the sheave when he is ready to reel the line in evenly when desired. It will be observed that my attachment in no way interferes with the ordinary operation of the reel, and that it saves the fisherman from paying any attention to the manner in which the line is being wound on the reel when reeling in.

I have illustrated and described a train of wheels which I have found in practice to operate successfully with the fishing reels in the market. By having a different number of different gears and pinions, the line arm can be given a faster or slower oscillation. I have enlarged the inner end of the cam slot in the line arm so as to give the arm substantially an even motion, and have therefore made the slot almost circular as to the inner half thereof. By placing the sheave eccentric to the central line of the pole, the springs at the side of the line arm may be omitted.

Having described my invention what I claim is:—

1. A line winding attachment comprising a train of wheels; a sheave mounted upon one of the shafts of said train of wheels; a line winding arm loosely and revolubly mounted upon the sheave shaft, said arm having a cam slot therein; a stud mounted in one of said train of wheels and projecting into said cam slot; and means to secure a line to the outer end of said arm.

2. A line winding attachment for reels comprising an oscillating line directing arm; means to detachably secure the same upon a fishing pole; a line wound on a reel; means to detachably secure said line to the said arm; a sheave around which the line is wound one or more turns when positioned for use; and means operable by the rotation of the sheave to oscillate said arm.

In witness that I claim the foregoing I have hereunto subscribed my name this 4th day of October, 1910.

CARL F. CAPELL.

Witnesses:
 G. E. HARPHAM,
 S. B. ZEHRING.